(12) United States Patent
Du et al.

(10) Patent No.: US 11,443,245 B1
(45) Date of Patent: Sep. 13, 2022

(54) METHOD AND SYSTEM FOR FEDERATED ADVERSARIAL DOMAIN ADAPTATION

(71) Applicant: Alipay Labs (Singapore) Pte. Ltd., Singapore (SG)

(72) Inventors: Jian Du, Sunnyvale, CA (US); Yan Shen, Buffalo, NY (US); Mingchen Gao, Williamsville, NY (US); Benyu Zhang, Palo Alto, CA (US)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/382,809

(22) Filed: Jul. 22, 2021

(51) Int. Cl.
  *G06N 20/00* (2019.01)
  *G06N 20/20* (2019.01)

(52) U.S. Cl.
  CPC .................................. *G06N 20/20* (2019.01)

(58) Field of Classification Search
  CPC .............................. G06N 20/20; G06N 20/00
  USPC .......................................................... 706/12
  See application file for complete search history.

(56) References Cited

U.S. PATENT DOCUMENTS

| | | | |
|---|---|---|---|
| 10,270,599 | B2 | 4/2019 | Nadeau et al. |
| 10,490,066 | B2 | 11/2019 | Green et al. |
| 2018/0373988 | A1 | 12/2018 | Dhanyamraju et al. |
| 2019/0012592 | A1 | 1/2019 | Beser et al. |
| 2019/0042937 | A1 | 2/2019 | Sheller et al. |
| 2019/0050515 | A1 | 2/2019 | Su et al. |
| 2019/0050746 | A1 | 2/2019 | Sanketi et al. |
| 2019/0138934 | A1 | 5/2019 | Prakash et al. |
| 2019/0138940 | A1 | 5/2019 | Feuz et al. |
| 2019/0171978 | A1 | 6/2019 | Bonawitz |
| 2019/0220703 | A1 | 7/2019 | Prakash et al. |
| 2019/0220755 | A1 | 7/2019 | Carbune et al. |
| 2019/0227980 | A1 | 7/2019 | Mcmahan et al. |

(Continued)

FOREIGN PATENT DOCUMENTS

| | | | |
|---|---|---|---|
| WO | WO-2021059066 | A1 * | 4/2021 |
| WO | WO-2021119601 | A1 * | 6/2021 |

OTHER PUBLICATIONS

Wang, et al., "A Comprehensive survey of loss functions in machine learning", Annals of Data Science, 2020 (Year: 2020).*

(Continued)

*Primary Examiner* — Omar F Fernandez Rivas
*Assistant Examiner* — Selene A. Haedi

(57) ABSTRACT

Methods, systems, and apparatuses, including computer programs encoded on computer storage media, for federal learning are disclosed. One exemplary method may include receiving, by a client device from a server device, model parameters of a global machine learning model being collaboratively trained by the client device and the server device; constructing, by the client device, a local machine learning model based on the model parameters of the global machine learning model, wherein the local machine learning model comprises two branches corresponding to two loss functions; training, by the client device, the local machine learning model based on local training data, wherein the training comprises updating the model parameters to minimize a first loss function of the two loss functions and maximize a second loss function of the two loss functions; and sending, by the client device, the updated model parameters back to the server device.

20 Claims, 8 Drawing Sheets

(56) References Cited

U.S. PATENT DOCUMENTS

| | | | |
|---|---|---|---|
| 2019/0279082 A1 | 9/2019 | Moloney et al. | |
| 2019/0340534 A1 | 11/2019 | Mcmahan et al. | |
| 2021/0174243 A1* | 6/2021 | Angel | G06N 20/20 |
| 2021/0326698 A1* | 10/2021 | Bukharev | G06N 3/08 |
| 2022/0012637 A1* | 1/2022 | Rezazadegan Tavakoli | G06N 20/10 |

OTHER PUBLICATIONS

Yang et al., "Federated Machine Learning: Concept and Applications", Jan. 2019 (Year: 2019).*
Reisizadeh et al., "FedPAQ: A Communication-Efficient Federated Learning Method with Periodic Averaging and Quantization", Aug. 2020 (Year: 2020).*
Acar et al., "Federated learning based on dynamic regularization," International Conference on Learning Representations, Mar. 25, 2021.
Agarwal et al., "cpSGD: Communication-efficient and differentially-private distributed SGD," Advances in Neural Information Processing Systems, May 27, 2018.
Alistarh et al., "QSGD: Communication-Efficient SGD via Gradient Quantization and Encoding," Dec. 6, 2017.
Arbelaez et al., "Contour detection and hierarchical image segmentation," IEEE transactions on pattern analysis and machine intelligence, 33(5):898-916, Aug. 26, 2010.
Ben-David et al., "A theory of learning from different domains," Machine learning, 79(1):151-175, 2010.
Chen et al., "Breaking the Communication-Privacy-Accuracy Trilemma," Apr. 20, 2021.
Ganin et al., "Unsupervised domain adaptation by backpropagation," International conference on machine learning, Feb. 27, 2015.
Ganin et al., "Domain-adversarial training of neural networks,"The journal of machine learning research, May 26, 2016.
Jin et al., "What is local optimality in nonconvexnonconcave minimax optimization?," International Conference on Machine Learning, Aug. 15, 2020.
Jin et al., "Towards utilizing unlabeled data in federated learning: A survey and prospective," May 11, 2020.
Kairouz et al., "Advances and open problems in federated learning," Mar. 9, 2021.
Karimireddy et al., "Scaffold: Stochastic controlled averaging for federated learning," International Conference on Machine Learning, Apr. 9, 2021.
Konečný et al., "Federated learning: Strategies for improving communication efficiency," Oct. 30, 2017.
Li et al., "LotteryFL: Personalized and Communication-Efficient Federated Learning with Lottery Ticket Hypothesis on Non-IID Datasets," Aug. 7, 2020.
Li et al., "Federated learning: Challenges, methods, and future directions," IEEE Signal Processing Magazine, Aug. 21, 2019.
Li et al., "Federated optimization in heterogeneous networks," arXiv:1812.06127, Apr. 21, 2020.
Li et al., "On the convergence of fedavg on non-iid data," 2020 International Conference on Learning Representations, Jun. 25, 2020.
Li et al., "Multi-site fMRI Analysis Using Privacy-preserving Federated Learning and Domain Adaptation: ABIDE Results," Medical Image Analysis, Dec. 6, 2020.
Lin et al., "On gradient descent ascent for nonconvex-concave minimax problems," International Conference on Machine Learning, Jun. 51, 2020.
Lin et al., "Near-optimal algorithms for minimax optimization," Conference on Learning Theory, Jun. 14, 2020.
Long et al., "Conditional adversarial domain adaptation," 32nd Conference on Neural Information Processing Systems, Dec. 29, 2018.
Lu et al., "Hybrid block successive approximation for one-sided non-convex min-max problems: algorithms and applications," IEEE Transactions on Signal Processing, Mar. 16, 2021.
McMahan et al., "Communication-efficient learning of deep networks from decentralized data," Artificial Intelligence and Statistics, Feb. 28, 2017.
Mishchenko et al., "Distributed learning with compressed gradient differences," Jun. 2, 2019.
Nouiehed et al., "Solving a Class of Non-Convex Min-Max Games Using Iterative First Order Methods," Oct. 31, 2019.
Peng et al., "Federated adversarial domain adaptation," International Conference on Learning Representations, Dec. 21, 2019.
Quiñonero-Candela et al., Dataset shift in machine learning. Mit Press, 2009.
Rafique et al., "Non-convex min-max optimization: Provable algorithms and applications in machine learning," May 11, 2021.
Rasouli et al., "FedGAN: Federated Generative Adversarial Networks for Distributed Data," Jun. 15, 2020.
Reisizadeh et al., "Robust Federated Learning: The Case of Affine Distribution Shifts," Jun. 16, 2020.
Russakovsky et al., "Imagenet large scale visual recognition challenge," International journal of computer vision, Jan. 30, 2015.
Saenko et al., "Adapting visual category models to new domains," European conference on computer vision, Sep. 2010.
Sandler et al., "MobileNetV2: Inverted Residuals and Linear Bottlenecks," Proceedings of the IEEE conference on computer vision and pattern recognition, Mar. 21, 2019.
Wang et al., "Tackling the objective inconsistency problem in heterogeneous federated optimization," Jul. 15, 2020.
Wang et al., "D2P-Fed: Differentially Private Federated Learning With Efficient Communication," Jan. 2, 2021.
Xia et al., "Auto-FedAvg: Learnable Federated Averaging for Multi-Institutional Medical Image Segmentation," Apr. 20, 2021.
Zhang et al., "FedPD: A Federated Learning Framework with Optimal Rates and Adaptivity to Non-IID Data," Jul. 7, 2020.
Zhang et al., "Bridging theory and algorithm for domain adaptation," International Conference on Machine Learning, Jul. 22, 2019.
Zhao et al., "Adversarial Multiple Source Domain Adaptation," Advances in neural information processing systems, Dec. 3, 2018.

* cited by examiner

400

Require: Initialize $\omega_0^0, \psi_0^0, \mu_1, \mu_2, \eta_1, \eta_2, \eta_3, \{M_i\}_{i=0}^{N}, T$
1: for $t = 0, \ldots, T-1$ do
2:    for each client $i \in [N]$ in parallel do
3:       $\widehat{\omega}_i^0 = \omega_0^t$;
4:       $\widehat{\psi}_i^0 = \psi_0^t$
5:       # Local Update:
6:       for $m = 0, \ldots, M_i - 1$ do
7:          $\widehat{\omega}_i^{m+1} = \widehat{\omega}_i^m - \eta_1 [\nabla_{\omega_i} f_i(\widehat{\omega}_i^m, \widehat{\psi}_i^m) + \mu_1(\widehat{\omega}_i^m - \omega_0^t) + \lambda_i^t]$
8:          $\widehat{\psi}_i^{m+1} = \widehat{\psi}_i^m + \eta_2 [\nabla_{\psi_i} f_i(\widehat{\omega}_i^m, \widehat{\psi}_i^m) - \mu_2(\widehat{\psi}_i^m - \psi_0^t) - \beta_i^t]$    ▷ gradient descent
                                                                                                                  ▷ gradient ascent
9:       end for
10:      $\omega_i^{t+1} = \widehat{\omega}_i^{M_i}$;    $\psi_i^{t+1} = \widehat{\psi}_i^{M_i}$
11:      $\lambda_i^{t+1} = \lambda_i^t + \mu_1(\omega_i^{t+1} - \omega_0^t)$;    $\beta_i^{t+1} = \beta_i^t + \mu_2(\psi_i^{t+1} - \psi_0^t)$
12:      $\omega_i^{t+} = \omega_i^{t+1} + \frac{\eta_3}{\mu_1}\lambda_i^{t+1}$;    $\psi_i^{t+} = \psi_i^{t+1} + \frac{\eta_3}{\mu_2}\beta_i^{t+1}$    ▷ dual ascent descent
13:    end for
14:    # Global Update:
15:    $\omega_0^{t+1} = \frac{1}{N}\sum_{i=1}^{N} \omega_i^{t+}$;    $\psi_0^{t+1} = \frac{1}{N}\sum_{i=1}^{N} \psi_i^{t+}$
16: end for

FIG. 4

METHOD AND SYSTEM FOR FEDERATED ADVERSARIAL DOMAIN ADAPTATION

TECHNICAL FIELD

The disclosure generally relates to systems and methods for federated learning, and in particular, to federated learning with adversarial domain adaptation based on training data collected from different domains.

BACKGROUND

Federated learning (also known as collaborative learning) is a machine learning technique that trains a model across multiple decentralized client devices (e.g., a device providing an entry point into enterprise or service provider core networks) holding local data samples without directly sharing potentially sensitive data with other clients. During the training process, many clients perform separate training of customized machine learning models on individual devices and then send their local updates (e.g., model gradients or model parameters) to a trusted server. Then the server aggregates these local updates to compute the global updates and sends the global updates back to the clients for model synchronizing and further training. This iterative process stops when the model meets certain performance criteria.

However, existing federated learning faces multiple challenges. For example, domain shift of client data (e.g., local training data) may occur when the training data on different clients are sampled from different parts of the sample space. In other words, different clients may collect local training data from different domains with different distributions using different techniques, which may make the collaborative training hard (e.g., taking too long, or sometimes impossible) to converge. For example, the fMRI (Functional magnetic resonance imaging) data from different hospitals have various distributions because scanners made by different manufacturers are different in their calibration and different acquisition protocols specified can have different effects. In this disclosure, a generic federated saddle point optimizer, named Federated Minimax (FedMM), is described to handle federated training with local training data collected from different domains.

SUMMARY

Various embodiments of the present specification may include systems, methods, and non-transitory computer-readable media for optimizing federated adversarial domain adaptation.

According to one aspect, the method for optimizing federated adversarial domain adaptation may comprise: receiving, by a client device from a server device, model parameters of a global machine learning model being collaboratively trained by the client device and the server device; constructing, by the client device, a local machine learning model based on the model parameters of the global machine learning model, wherein the local machine learning model comprises two branches corresponding to two loss functions; training, by the client device, the local machine learning model based on local training data, wherein the training comprises updating the model parameters to minimize a first of the two loss functions and maximize a second of the two loss functions; and sending, by the client device, the updated model parameters back to the server device.

In some embodiments, the local training data are collected from one or more domains, and the local machine learning model comprises a feature extraction layer shared by a label prediction branch and a domain classification branch, the feature extraction layer extracting features from input training data, the label prediction branch predicting a label for the input training data based on the extracted features, and the domain classification branch predicting a domain from which the input training data is collected.

In some embodiments, the model parameters from the server device comprise a first set of parameters and a second set of parameters of the global machine learning model, and constructing the local machine learning model comprises: constructing the feature extraction layer and the label prediction branch based on the first set of parameters; and constructing the domain classification branch based on the second set of parameters.

In some embodiments, the local training data comprises a plurality of labeled training data entries collected from one or more source domains, and a plurality of unlabeled training data entries collected from a target domain, and the training the local machine learning model comprises: training the feature extraction layer and the label prediction branch based on the plurality of labeled training data; and training the feature extraction layer and the domain classification branch based on the plurality of labeled training data and the plurality of unlabeled training data.

In some embodiments, the adjusting the model parameters to minimize the first of the two loss functions comprises: adjusting the model parameters to minimize errors of the label prediction branch.

In some embodiments, the adjusting the model parameters to maximize the second of the two loss functions comprises: adjusting the model parameters to maximize errors of the domain classification branch.

In some embodiments, the model parameters from the server device comprise a first set of parameters and a second set of parameters of the global machine learning model, and the training of the local machine learning model comprises: obtaining predictions from the local machine learning model in response to input training data; updating the first set of parameters using gradient descent based on the obtained predictions; and updating the second set of parameters using gradient ascent based on the obtained predictions.

In some embodiments, the updating the first set of parameters using gradient descent comprises: determining a new first set of parameters based on the first set of parameters and a first dual variable for restricting gradient divergence; and wherein the updating the second set of parameters using gradient ascent comprises: determining a new second set of parameters based on the second set of parameters and a second dual variable for restricting gradient divergence.

In some embodiments, the method further comprises updating the first dual variable based on the new first set of parameters; updating the second dual variable based on the new second set of parameters; obtaining an updated first set of parameters based on the updated first dual variable and the new first set of parameters; obtaining an updated second set of parameters based on the updated second dual variable and the new second set of parameters.

In some embodiments, the sending the updated model parameters back to the server device for global update comprises: sending the updated first set of parameters and the updated second set of parameters to the server device for aggregation.

In some embodiments, the training the local machine learning model based on the local training data is an iterative training process comprising a plurality of iterations of parameter updating.

According to another aspect, a system for optimizing federated adversarial domain adaptation may comprise one or more processors and one or more non-transitory computer-readable memories coupled to the one or more processors and configured with instructions executable by the one or more processors to cause the system to perform operations comprising: receiving, from a server device, model parameters of a global machine learning model being collaboratively trained by the system and the server device; constructing a local machine learning model based on the model parameters of the global machine learning model, wherein the local machine learning model comprises two branches corresponding to two loss functions; training the local machine learning model based on local training data, wherein the training comprises updating the model parameters to minimize a first of the two loss functions and maximize a second of the two loss functions; and sending the updated model parameters back to the server device.

According to yet another aspect, a non-transitional computer storage media of a client device may be configured with instructions executable by one or more processors to cause the one or more processors to perform operations comprising: receiving, from a server device, model parameters of a global machine learning model being collaboratively trained by the client device and the server device; constructing a local machine learning model based on the model parameters of the global machine learning model, wherein the local machine learning model comprises two branches corresponding to two loss functions; training the local machine learning model based on local training data, wherein the training comprises updating the model parameters to minimize a first of the two loss functions and maximize a second of the two loss functions; and sending the updated model parameters back to the server device.

Embodiments disclosed in the specification have one or more technical effects. In some embodiments, a client may construct an adversarial neural network during local training to address the domain shifting issue. The domain shifting issue exists when the training data on the client may include labeled training data collected from source domains and unlabeled data collected from target domains. For example, the adversarial neural network uses the labeled and unlabeled training data differently in the training in order to train a more robust model (e.g., adaptive to all types of domains). The labeled training data is used to increase the label prediction accuracy of the model, while the unlabeled training data is used to decrease the domain-sensitivity of the model. Here, the "domain-sensitivity" means whether the model can easily determine a training data is from a source domain or a target domain based on the feature extracted from the training data. When the "domain-sensitivity" is low, it means the features extracted from the training data are less domain-discriminative, and thus the trained feature extraction and label prediction capability may make accurate predictions for unlabeled data as well as observed data from the target domains.

In some embodiments, after receiving model parameters of a global machine learning (ML) model from a server, each client device constructs a local ML model based on the model parameters and performs iterative local training to find the local optimal parameters. These local optimal parameters may then be sent back to the server for global update and next round of federated learning. This iterative local training effectively reduces the frequency of client-server data (model parameters) exchange and the related communication cost.

In some embodiments, the local training includes searching for a saddle-point with regarding to the local ML model parameters based on training data collected from source domains (e.g., training data with proper labels) and target domain (e.g., data without proper labels and to be labeled by using the trained model). The saddle-point refers to a set of model parameters that allows the local ML model to minimize errors of label predictions (e.g., predicting labels for given training data) and maximize errors of domain classifications (e.g., predicting that given training data is from the source domain(s) or the target domain). This way, the trained local model is both accurate (e.g., accurately predicting labels) and robust (e.g., domain-insensitive) to make accurate predictions in both the source domains and the target domains.

In some embodiments, in order to improve the training efficiency of the local training, a plurality of dual-variables are introduced to bound the local training to prevent drifting from convergence. These dual-variables are respectively used for gradient descent in the minimizing errors of label predictions and gradient ascent in maximizing the errors of domain classifications, which ensure that the client's optima is asymptotically consistent with the saddle point of the global empirical loss. Convergence analysis and experimental results show that, with the gradient descent and ascent training for both model parameters and the dual-variables, the local training guarantees convergence even if the data distribution suffers from domain shift, and the local training converges in a much faster rate. The faster convergence of the local training means a less number of server-client data exchanges is required to train the global optimized model.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4 illustrates an exemplary method for federated adversarial domain adaptation with saddle point optimization in accordance with some embodiments.

DETAILED DESCRIPTION

Machine learning models that unleash their full power base on massive amounts of training data have achieved success in different applications, such as computer vision, speech recognition, and disease diagnosis. In a traditional machine learning pipeline, the training data among clients, such as individual customers or business entities, e.g., tech companies, banks, and hospitals, are gathered together in central servers for the model training. The limited communication bandwidth, however, limits the efficiency of data transmission. More importantly, in many cases, it is not appropriate to collect sensitive data (typing histories, location trajectory, personal photos, etc.) due to privacy and security requirements.

To address these problems, Federated Learning (FL) has been proposed, whereby many clients perform separate training of customized machine learning models on individual devices and then send their local updates (e.g., model gradients or model parameters, collectively called parameter vector) to a trusted server. Then the server aggregates these updates to compute the global updates. Federated Learning enables edge devices such as mobile phones to collaboratively learn a shared prediction model while keeping the training data on the device, decoupling the ability to do machine learning from the need to store the data in the cloud.

Many FL problems have been characterized as empirical minimization of a global loss objective, which can be decomposed into client-level empirical loss minimization coordinated by the server. However, this kind of characterization fails to generalize FL to the cases in which the clients have domain-shifted unsupervised dataset. For example, the clients involved in an FL may have local training data collected from different domains with different underlying data distributions. These domains may include one or more source domains and a target domain. The data collected from the source domains may be properly labeled, while the data collected from the target domain may not be labeled. The FL is to train a model based on the data from both the source domains and the target domain, and deploy the trained model in the target domain to make predictions. This process may be denoted as federated adversarial domain adaptation.

Figure 1:
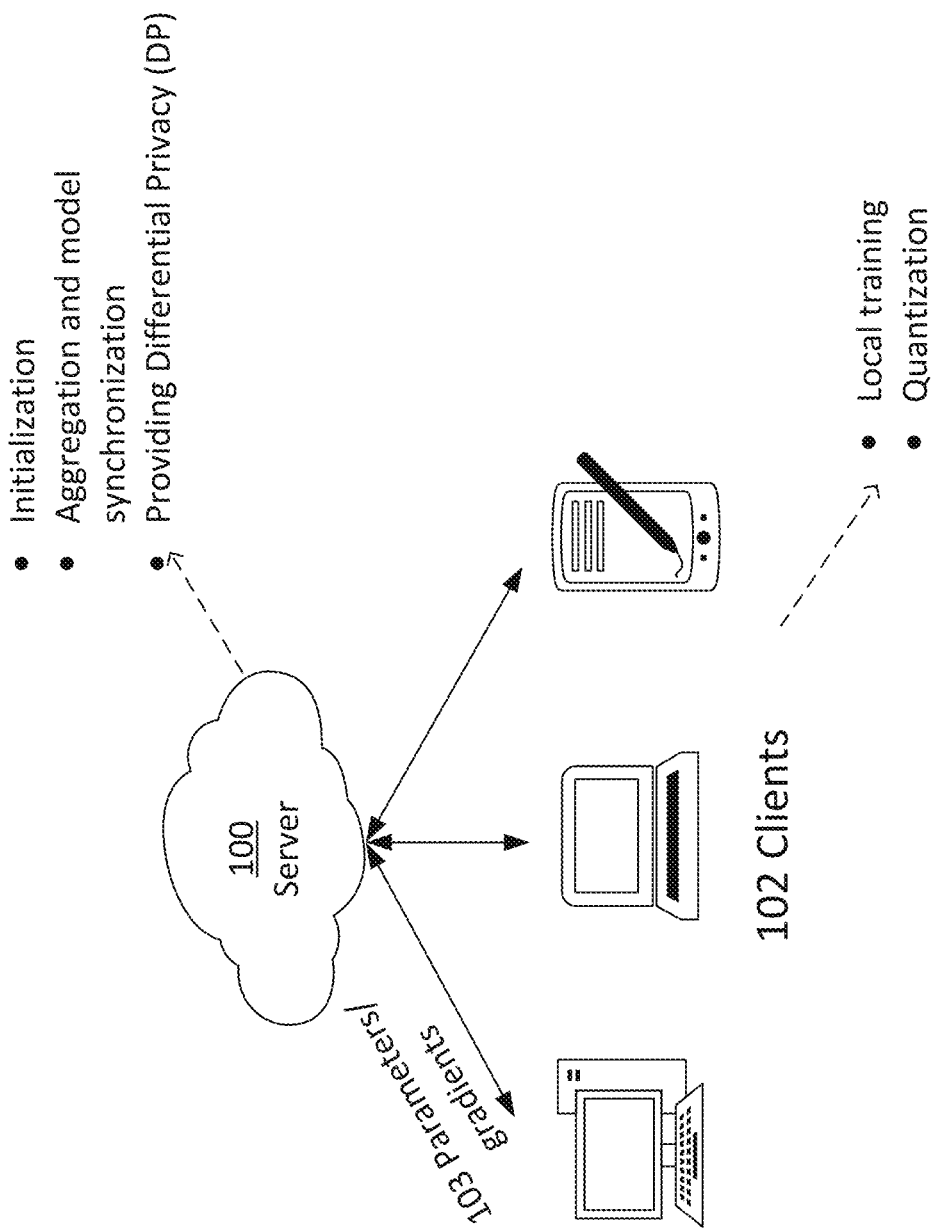
FIG. 1 illustrates an exemplary framework of federated learning (FL) in accordance with some embodiments.

FIG. 1 illustrates an exemplary framework of federated learning (FL) in accordance with some embodiments. Federated learning (FL) enables multiple client devices to train a common, robust machine learning model without sharing data.

As shown in FIG. 1, in some embodiments, a FL framework may include a server 100 and multiple clients 102, communicating via communication channels between the clients 102 and the server 100. The server 100 may be coupled to each of a plurality of clients 102 to form a federated learning network. In some embodiments, the server 100 may include a computing system or a computing device. It is to be understood that although one server 100 is shown in FIG. 1, any number of computing devices may work collectively and treated as the server 100. The server 100 may be implemented in one or more networks (e.g., enterprise networks), one or more endpoints, one or more data centers, or one or more clouds. The server 100 may include hardware or software which manages access to a centralized resource or service in a network. A cloud may include a cluster of servers and other devices which are distributed across a network.

In some embodiments, the clients 102 may include various types of terminal devices, such as a mobile phone, tablet, server, desktop computer, laptop computer, etc. The server 100 may communicate with the clients 102, and other computing devices. Communication between devices may occur over the internet, through a local network (e.g., LAN), through direct communication (e.g., BLUETOOTH™, radio frequency, infrared), etc.

FL relies on an iterative process broken up into an atomic set of client-server interactions known as a federated learning round. Each round of this process includes transmitting the current global model state or parameters to participating clients 102, respectively training local models on these local clients 102 to produce a set of potential model updates, and then aggregating and processing these local updates into a single global update and applying it to update the global model at the server 100. As shown in FIG. 1, the central server 100 aggregates and processes the local updates, while local clients 102 respectively perform local training depending on the central server 100's orders.

In some embodiments, the server 100 may be configured to implement global machine learning model initialization, local updates aggregation, and model synchronization. The global machine learning model initialization may be treated as a starting point of a federated learning (FL) process. For example, a global machine learning model (e.g., linear regression, neural network, boosting) may be chosen to be trained on the server 100, and some initial parameters (also called a parameter vector) 103 of the global machine learning model may be broadcasted to the clients 102 for the first round of FL training. The parameter vector of the global machine learning model may include global parameters or gradients 103 of the global machine learning model. After the clients 102 perform local training based on the global parameters 103 and training data collected locally, the clients 102 may transmit local updates 104 back to the server 100 for aggregation and model synchronization.

After receiving local updates from the clients 102, the server 100 may aggregate these updates to perform global updates to the global machine learning model. The global updates may include aggregation of the local updates from the clients 102 and model synchronization based on the global machine learning model and the local updates 104. This process may generate a new set of global parameters that improve the performance of the global machine learning model.

On the clients 102 side, each of the clients 102 may obtain local updates after performing the local training based on the global parameters or gradients 103 and the local training data. The local updates may include gradients or model parameters of the locally trained model. In this disclosure, the "parameters or gradients of the local/global model" may also be referred to as "a parameter vector of a local/global model," The volume of the local updates may increase as the locally trained model size increases. In order to reduce the data transmitting cost of the local updates from the clients to the server, the local updates may go through a quantization process for mapping continuous infinite values to a smaller set of discrete finite values. For example, each floating parameter in the local updates may be represented with 32 bits. After quantization, the floating parameter may be mapped to a smaller set of values that can be represented by 4 bits. That is, the quantization may improve the transmitting efficiency by 8 times, thus reducing the requirement for communication bandwidth.

In some embodiments, the server 100 and the clients 102 may be further configured to perform other suitable operations. For example, the server 100 may perform client selection to determine which clients 102 to participate in the current round of FL learning. The server 100 and/or the clients 102 may also perform data encryption/decryption, training data sampling (e.g., subsampling mini batches), failure recovery (e.g., handing failures for disconnected clients or lost model updates), flow control (e.g., the starting and termination of the FL learning), other suitable tasks, or any combination thereof. For example, different clients (e.g., terminal devices) may be selected to participate in each FL round.

Figure 2:
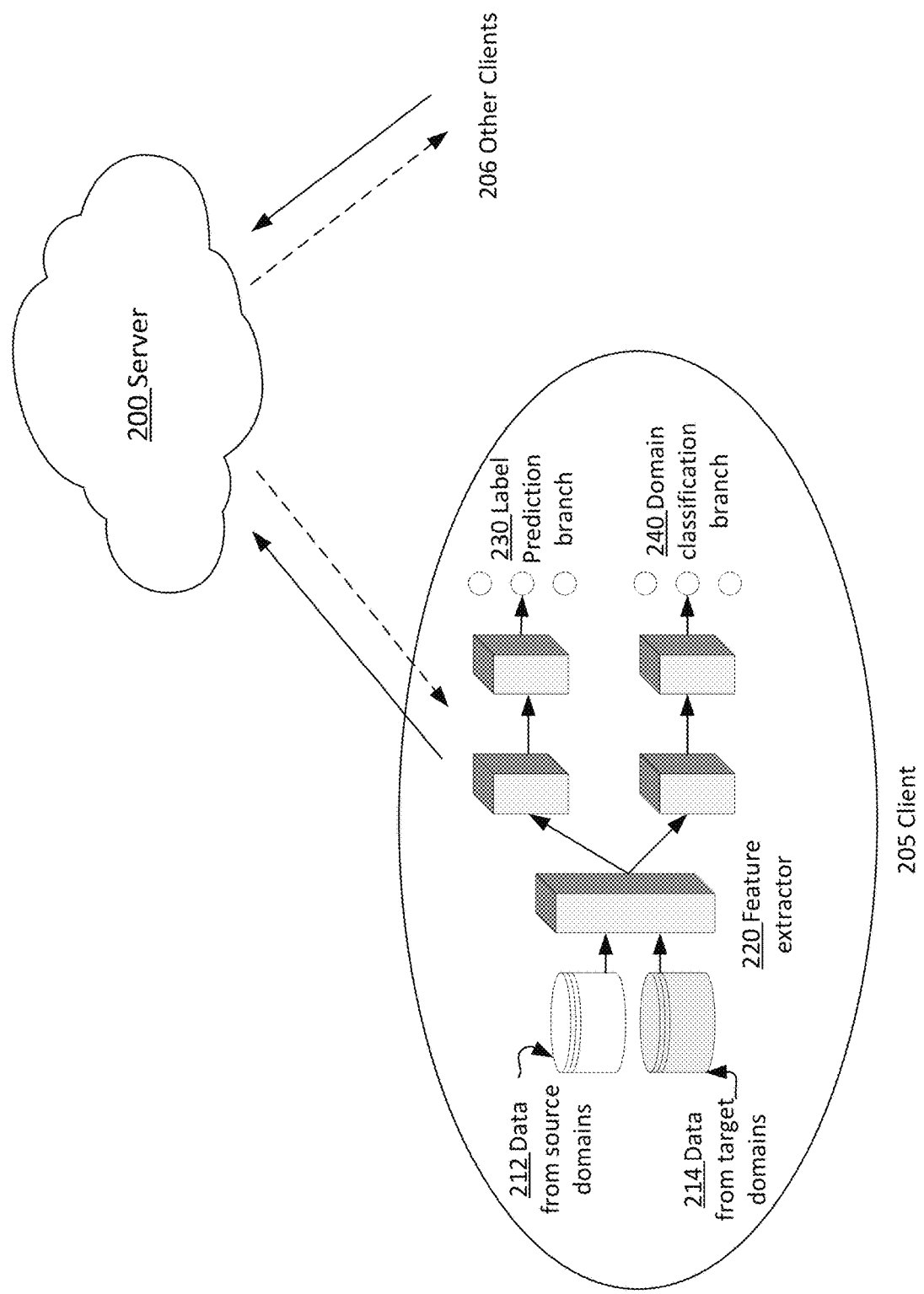
FIG. 2 illustrates an exemplary setup for federated adversarial domain adaptation in accordance with some embodiments.

FIG. 2 illustrates an exemplary setup for federated adversarial domain adaptation in accordance with some embodiments.

In some embodiments, client devices in a FL network may possess training data collected from source domains 212 and/or target domains 214. The source domains may refer to the domains from which labeled training data is collected. The target domains may refer to the domains to which a resultant model trained by the FL network will be deployed. Accordingly, the data collected from the source domains 212 may include training data with proper labels, while the data collected from the target domains 214 may include unlabeled training data. The process of transferring knowledge learned from the labeled source domains to the unlabeled target domains may be referred to as domain adaptation. Using FL to achieve domain adaptation through adversarial learning based on the labeled and unlabeled data may be referred to as federated adversarial domain adaptation.

In different practical scenarios, one client 205 may possess a mixed of labeled training data 212 and the unlabeled training data 214, or just one of them (extreme cases). In the following description, it is assumed that the client has both labeled training data 212 and the unlabeled training data 214 to illustrate how different training data are involved in the training process.

An exemplary local training process is described below. In some embodiments, as a starting point, the client 205 may receive model parameters of a global machine learning model (also called global model) being collaboratively trained by the server 200 and the clients 205 and 206. Based on the received model parameters, the client 205 may construct a local machine learning model (also called local model) to start a local training process based on the training data 212 and 214 it possesses.

In some embodiments, the local model may include a feature extractor 220 (e.g., one or more feature extraction layer(s)), shared by a label prediction branch 230 and a domain classification branch 240. The feature extractor 220 may be trained to extract features from an input training data (e.g., either a labeled training data entry or an unlabeled training data entry). The label prediction branch 230 may be configured to predict a label for the input training data. The domain classification branch 240 may be configured to predict/classify whether the input training data is from a source domain or a target domain. In some embodiments, the local training process on the client 205 may include a minimax optimization that trains the model to minimize a first loss function corresponding to the label prediction branch 230 and maximize a second loss function corresponding to the domain classification branch 240.

For example, if the input training data is a labeled training data entry, the features extracted by the feature extractor 220 may go through the label prediction branch 230 that generates a predicted label. The parameters corresponding to the feature extractor 220 and the label prediction branch 230 may be tuned to minimize prediction errors, i.e , minimizing the distance between the predicted label and the actual label.

In some embodiments, for a given input training data from either the source domain or the target domain, the features extracted by the feature extractor 220 may also go through the domain classification branch 240 that predicts the origin/classification of the input training data, i.e., whether it is from a source domain or a target domain. During this process, the feature extractor 220 and the domain classification branch are trained in an adversarial manner. The feature extractor 220 may be trained to extract domain-insensitive features from the input training data, so that the domain classification branch 240 cannot determine whether the data is from the source domain or the target domain. At the same time, the domain classification branch 240 is trained to determine whether the data is from the source domain or the target domain. If the feature extractor 220 is sufficiently robust, the features extracted from the training data will fool the domain classification branch 240 to make incorrect predictions. Accordingly, the training goal of the feature extractor 220 and the domain classification branch 240 is to maximize the prediction/classification errors.

By jointly training the feature extractor 220, the label prediction branch 230, and the domain classification branch 240 with the different loss functions, the extracted features from an input data are tend to be both discriminative (e.g., so that the label prediction is more accurate) and invariant to domain changes between source and target domains (e.g., so that the knowledge is substantially transferred from the source domains to the target domains). This way, the local model may gradually become more accurate and robust in predicting labels for data from both the source domain and target domain.

Figure 3:
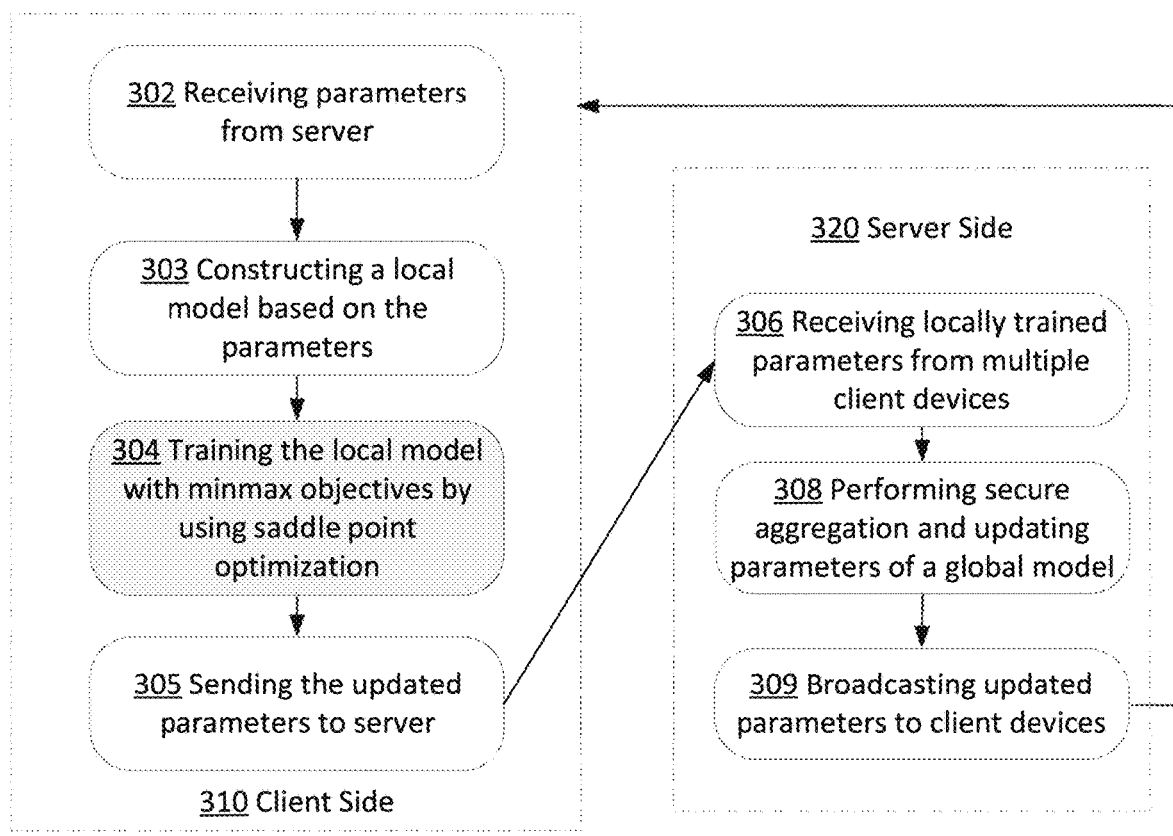
FIG. 3 illustrates an exemplary diagram for federated adversarial domain adaptation with saddle point optimization in accordance with some embodiments.

FIG. 3 illustrates an exemplary diagram for federated adversarial domain adaptation with saddle point optimization in accordance with some embodiments. The diagram in FIG. 3 includes the operations performed on the client side 310 and the operations performed on the server side 320. The operations are for illustrative purposes. Depending on the implementation, the client side 310 and/or the server side 320 may perform more, fewer, or alternative operations in various orders or in parallel. For example, the server side 320 may select clients to participate in an FL training round. In the following description, the term "client" and the term "terminal device" may be used interchangeably to refer to computing devices performing local training in an FL framework. Example devices may include a mobile phone, tablet, server, desktop computer, laptop computer, and so on.

In some embodiments, the client 310 may receive parameters (such as weights, gradients) of a global machine learning model at step 302 from the server 320. The parameters may be initialized parameters if the FL training round is the first training round, or partially trained parameters if some FL training rounds have already occurred.

In some embodiments, the client 310 may construct a local model based on the received parameters at step 303. The constructed local model and the global machine learning model may share a same or similar structure so that the parameters may be shared between the global and the local models. An example local model is illustrated in FIG. 2, which includes one or more feature extraction layer(s) (e.g., feature extractor 220), a label prediction branch 230, and a domain classification branch 240.

In some embodiments, the client 310 may perform iterative local training on the constructed local model based on the local training data at step 304. For example, assuming the local model illustrated in FIG. 2 is constructed at step 303, the parameters of the local model may be tuned to minimize a first loss function and simultaneously maximize a second loss function. The first loss function corresponds to the feature extraction layer(s) and the label prediction branch 230, while the second loss function corresponds to the domain classification branch 240. By adversarial training the two branches, the local model may become both discriminative and invariant to domain changes between source and target domains.

In some embodiments, the training process at step 304 may follow a Federated Minimax (FedMM) algorithm for faster convergence. The following description describes the derivation process of the FedMM algorithm.

The FL adversarial domain adaptation may be formulated as a federated saddle point optimization or a federated minimax optimization, which may be given by the following equation:

$$\min_{\omega_0, \omega_i \in \mathbb{R}^{d_1}} \max_{\psi_0, \psi_i \in \mathbb{R}^{d_2}} f(\omega, \psi) = \frac{1}{N} \sum_{i=1}^{N} f_i(\omega_i, \psi_i) \quad (1)$$

$$\text{s.t. } \omega_i = \omega_0, \psi_i = \psi_0, \forall i \in [N].$$

where N refers to the number of clients in the FL network, $\omega_0$ and $\psi_0$ refer to the global model parameters received from the server 320, $\omega_i$ and $\psi_i$ refer the parameters of $i_{th}$ client's locally trained model, $f_i$ refers to the average loss function at the $i_{th}$ client, and $f$ refers to average loss function at the server 320. The training process is to search for two sets of parameters $\omega_i$ and $\psi_i$ of the (global or local) model to minimize and maximize two types of errors (e.g., label prediction and domain classification). As shown in equation (1), $\omega_i$ is trained to minimize the average loss function, and $\psi_i$ is trained to maximize the average loss function. For example, the first set of parameter co correspond to the feature extraction layer(s) and the label prediction branch of the local model in FIG. 2, while the second set of parameters correspond to the domain classification branch of the local mode in FIG. 2. In some embodiments, the average loss function $f_i(\omega, \psi)$ may be computed by:

$$f_i(\omega, \psi) \triangleq \alpha_i \sum_{\xi_j \in \mathcal{D}_i} F_i(\omega, \psi; \xi_j), \quad (2)$$

where $\alpha_i$ refers to a weight coefficient of $i_{th}$ client, and $F(\omega, \psi; \xi_j)$ refers to the loss function with regarding to a data point $\xi_j$ data set $D_i$. In some embodiments, the loss function F may include a first loss function to be minimized and a second loss function to be maximized.

The above federated minimax optimization is difficult to solve. Existing federated optimizers generally focus on optimizing the local optimal minimum value. The federated minimax, on the other hand, is targeted with more difficult task of finding the saddle point that reaches the minimum value for one loss function and the maximum value for another loss function. Furthermore, inter-client data shift (the training data from different domains are not balanced among the clients) may cause the local model at each client to diverge from the server aggregation, making federated optimization difficult to converge.

To guarantee convergence regardless the inter-client data shift, in some embodiments, the above equation (1) may be transformed into an augmented Lagrangian form with a plurality of dual variables to bound the gradient descent and gradient ascent training process. The augmented Lagrangian form of equation (1) may be represented as:

$$\mathcal{L}_i(\omega_0, \omega_i, \lambda_i, \psi_0, \psi_i, \beta_i) \triangleq f_i(\omega_i, \psi_i) + \quad (3)$$

$$\langle \lambda_i, \omega_i - \omega_0 \rangle + \frac{\mu_1}{2} \|\omega_i - \omega_0\|_2^2 - \langle \beta_i, \psi_i - \psi_0 \rangle + \frac{\mu_2}{2} \|\psi_i - \psi_0\|_2^2.$$

where $\lambda$ and $\beta$ refer to two dual variables, the index i refers to the $i_{th}$ client. In some embodiments, the dual variables may be initialized as 0. With the Lagrangian transformation, the objective function in equation (1) is then transformed into a saddle-point minimax optimization of augmented Lagrangian functions over all primal-dual pairs, i.e., $\{\omega_i, \omega_0, \lambda_i, \lambda_0, \psi_i, \psi_0, \beta_i, \beta_0\}$ for all clients $i \in [N]$:

$$\min_{\omega_0, \omega_i, \lambda_i, \psi_0, \psi_i, \beta_i} \max \mathcal{L}(\{\omega_i\}_{i=0}^{N}, \{\psi_i\}_{i=0}^{N}, \{\lambda\}_{i=1}^{N}, \{\beta\}_{i=1}^{N}) \triangleq$$

$$\min_{\omega_0, \omega_i, \lambda_i, \psi_0, \psi_i, \beta_i} \max \frac{1}{N} \sum_{i=1}^{N} \mathcal{L}_i(\omega_0, \omega_i, \psi_0, \psi_i, \lambda_i, \beta_i).$$

By fixing the global consensus model parameters $\{\omega_0, \psi_0\}$, the augmented Lagrangian minimax problem (at the global scale) is separable and may be decomposed into multiple tasks denoted as $\mathcal{L}_i$ with regarding to local pairs $\{\omega_i, \lambda_i, \psi_i, \beta_i\}$ for client $i \in [N]$. Accordingly, the augmented Lagrangian minimax problem may be decomposed and independently updated on local clients periodically without global synchronization. FIG. 4 illustrates detailed steps of the FedMM-based training process.

In some embodiments, the iterative local training at client 310 may be terminated after a certain number of iterations or after the local model parameters are converged. The local model parameters after the termination of the local training may be sent back to the server 320 at step 305. The server 320 may collect locally trained model parameters from multiple clients at step 306, and perform aggregation and global update at step 308 to obtain new parameters of the global model. If the server 320 determines the FL training is not terminated yet (e.g., the number of FL training rounds has not been reached, or the global parameters are not converged yet), it may at step 309 broadcast the global parameters to the clients to perform another round of local training.

FIG. 4 illustrates an exemplary FedMM method 400 for federated adversarial domain adaptation with saddle point optimization in accordance with some embodiments. The FedMM method 400 is described in a pseudo code format for simplicity and clarity, and may be implemented in various programming tools.

At a high level, the FedMM method 400 includes three major steps: (i) parallel saddle-point optimization on all local augmented Lagrangian function $\mathcal{L}_i$ at client $i \in [N]$ with regarding to local model parameters denoted as $\{\omega_i, \psi_i\}$, in which one optimization oracle example is based on stochastic gradient descent and gradient ascent respectively on $\{\omega_i, \psi_i\}$; (ii) local stochastic gradient descent and ascent updates on the dual variables $\{\lambda_i, \beta_i\}$; and (iii) aggregation at the server to update global model parameters $\{\omega_0, \psi_0\}$.

In some embodiments, an FL scheduler (e.g., the server, one of the client, or another computing device) may initialize a plurality of parameters, including $\{\omega_0^0, \psi_0^0, \mu_1, \mu_2, \eta_1, \eta_2, \eta_3, \{M_i\}_{i=0}^N, T_i\}$, where $\omega_0^0$ and $\psi_0^0$ refer to the initial model parameters of the global model, $\mu_1$ and $\mu_2$ are two hyper parameters representing learning rates, $\{\eta_1, \eta_2, \eta_3\}$ refer to different decay factors, $\{M_i\}_{i=0}^N$ includes the local training round limitations for all N clients, and T refers to the global training round limitation. In some embodiments, $\omega_0$ refers to the parameters of the label prediction branch 230 in FIGS. 2, and $\psi_0$ refers to the parameters of the domain classification branch 240 in FIG. 2.

During $t_{th}$ global training round, all N clients may parallelly perform local training based on the global model parameters $\psi_0^t, \psi_0^t$, received from the server. For simplification, all variables with heads in FIG. 4 refer to the local parameters, and all variables without heads in FIG. 3 refer to the global parameters.

At line 3, the global parameters $\omega_0^t, \psi_0^t$, are used to initialize two local versions $\hat{\omega}_i^0, \hat{\psi}_i^0$ for local training. As shown at line 5, the local training continues for $M_i$ rounds at the $i_{th}$ client. During each local training round, one or more training data may be fed into the local model with parameters $\hat{\omega}_i^0, \hat{\psi}_i^0$ to obtain predictions. These predictions and the ground truth of the training data (e.g., labels or domain identifiers) may be used to determine the average loss function $f_i$.

At the $m_{th}$ ($0 \le m_{th} \le M_i-1$) round of local training, at lines 6-7, the local parameters $\hat{\omega}_i^m, \hat{\psi}_i^m$ may be updated as $\hat{\omega}_i^{m+1}, \hat{\psi}_i^{m+1}$, respectively based on $\hat{\omega}_i^m, \hat{\psi}_i^m$ and the local dual variables $\{\lambda_i^t, \beta_i^t\}$ (the subscription t refers to $t_{th}$ round of global training). The local dual variables $\{\lambda_i^t, \beta_i^t\}$ are introduced to restrict gradient divergence, i.e., prevent the gradient descent (line 6) and the gradient ascent (line 7) from drifting away.

After the $M_i$ rounds of local training, the dual variables $\{\lambda_i^t, \beta_i^t\}$ are updated at line 10 for the next round of global training. The local model parameters are then further restricted from diverging by performing the operations at line 11. Without the exponential decay factor $\eta_3$ on the offset of the dual variables at line 11, experimental results show that the training process would fail to converge at the global round if the local training round $M_i$ is insufficient. In other words, the exponential decay factor $\eta_3$ effectively reduces the local training steps. It may be set to 1 if $M_i$ is large enough.

After the local training at all clients are complete, the locally trained model parameters are sent to the server for a global update. Line 14 in FIG. 4 shows an example global update by simply averaging the model parameters received from all clients.

When the global training (e.g., the for-loop at line 1 in FIG. 4) is finished, the trained label prediction network branch may be deployed in the target domain for inference, i.e., generating predicted labels for observed data.

Figure 5:
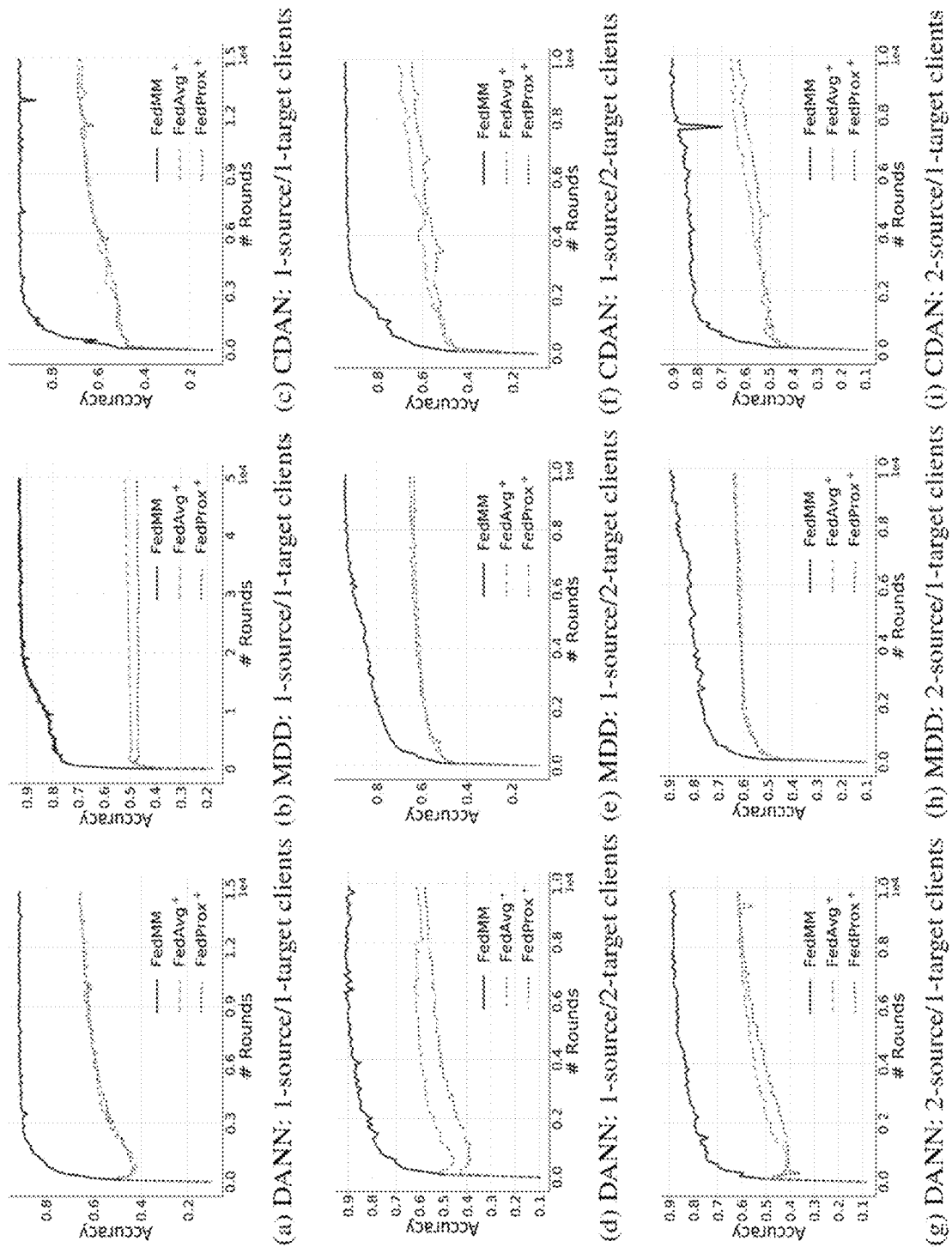
FIG. 5 illustrates exemplary experimental results of federated adversarial domain adaptation with saddle point optimization in accordance with some embodiments.

FIG. 5 illustrates exemplary experimental results of federated adversarial domain adaptation with saddle point optimization in accordance with some embodiments. Each of the charts in FIG. 5 shows a comparison between FedMM with two existing solutions named FedAvg+ and FedProx+ with $M_i=20$ for different source/target client settings. The DANN, MDD, and CDAN in FIG. 5 refer to three widely used domain adaptation methods, which may be implemented for generating input feature embeddings for the domain classification branch (as shown in FIG. 2). While both the FedAvg+ and FedProx+ converge, FedMM consistently outperforms them in terms of prediction accuracy and convergence speed for all DANN, MDD, and CDAN.

Figure 6:
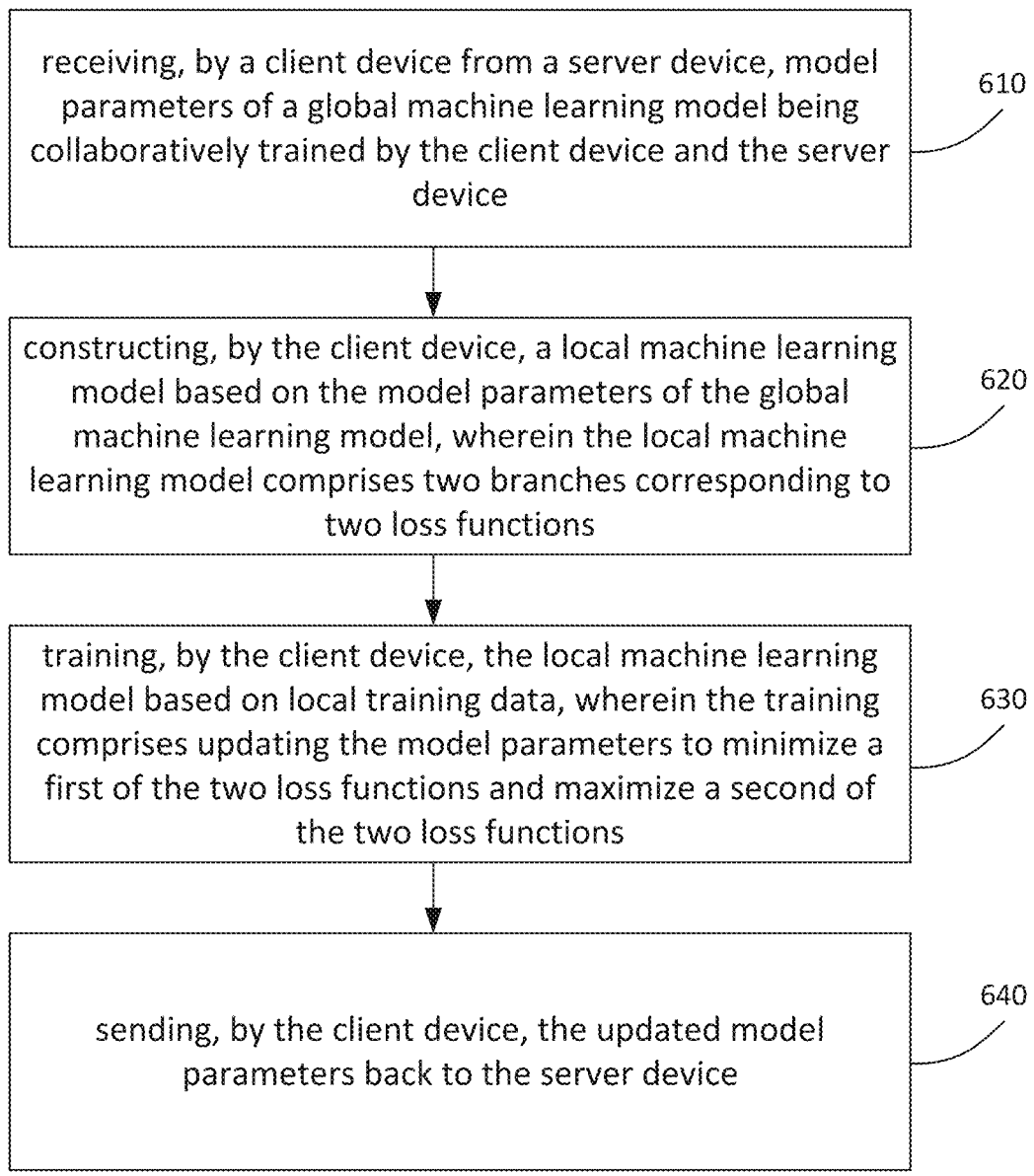
FIG. 6 illustrates an exemplary method for federated adversarial domain adaptation with saddle point optimization in accordance with some embodiments.

FIG. 6 illustrates an exemplary method 600 for federated adversarial domain adaptation with saddle point optimization in accordance with some embodiments. The method 600 may be performed by a device, apparatus, or system for FL. The method 600 may be performed by one or more modules/components of the environment or system illustrated by FIGS. 1-5, such as the client side 310 or the server side 320 in FIG. 3. The operations of the method 600 presented below are intended to be illustrative. Depending on the implementation, the method 600 may include additional, fewer, or alternative steps performed in various orders or in parallel.

Step 610 of method 600 may include receiving, by a client device from a server device, model parameters of a global machine learning model being collaboratively trained by the client device and the server device.

Step 620 of method 600 may include constructing, by the client device, a local machine learning model based on the model parameters of the global machine learning model, wherein the local machine learning model comprises two branches corresponding to two loss functions. In some embodiments, the model parameters from the server device comprise a first set of parameters and a second set of parameters of the global machine learning model, and constructing the local machine learning model comprises: constructing the feature extraction layer and the label prediction branch based on the first set of parameters; and constructing the domain classification branch based on the second set of parameters.

Step 630 of method 600 may include training, by the client device, the local machine learning model based on local training data, wherein the training comprises updating the model parameters to minimize a first of the two loss functions and maximize a second of the two loss functions. In some embodiments, the local training data are collected from one or more domains, and the local machine learning model comprises a feature extraction layer shared by a label prediction branch and a domain classification branch, the feature extraction layer extracting features from input training data, the label prediction branch predicting a label for the input training data based on the extracted features, and the domain classification branch predicting a domain from which the input training data is collected.

In some embodiments, the local training data comprises a plurality of labeled training data collected from one or more source domains, and a plurality of unlabeled training data collected from a target domain, and the training the local machine learning model comprises: training the feature extraction layer and the label prediction branch based on the plurality of labeled training data; and training the feature extraction layer and the domain classification branch based on the plurality of labeled training data and the plurality of unlabeled training data. In some embodiments, the adjusting the model parameters to minimize the first of the two loss functions comprises: adjusting the model parameters to minimize errors of the label prediction branch. In some embodiments, the adjusting the model parameters to maximize the second of the two loss functions comprises: adjusting the model parameters to maximize errors of the domain classification branch.

In some embodiments, the model parameters from the server device comprise a first set of parameters and a second set of parameters of the global machine learning model, and the training of the local machine learning model comprises: obtaining predictions from the local machine learning model in response to input training data; updating the first set of parameters using gradient descent based on the obtained predictions; and updating the second set of parameters using gradient ascent based on the obtained predictions. In some embodiments, the updating the first set of parameters using gradient descent comprises: determining a new first set of parameters based on the first set of parameters and a first dual variable for restricting gradient divergence; and wherein the updating the second set of parameters using gradient ascent comprises: determining a new second set of parameters based on the second set of parameters and a second dual variable for restricting gradient divergence.

In some embodiments, the method 600 may further comprise updating the first dual variable based on the new first set of parameters; updating the second dual variable based on the new second set of parameters; obtaining an updated first set of parameters based on the updated first dual variable and the new first set of parameters; obtaining an updated second set of parameters based on the updated second dual variable and the new second set of parameters. In some embodiments, the training the local machine learning model based on the local training data is an iterative training process comprising a plurality of iterations of parameter updating.

Step 640 of method 600 may include sending, by the client device, the updated model parameters back to the server device. In some embodiments, the sending the updated model parameters back to the server device for global update comprises: sending the updated first set of parameters and the updated second set of parameters to the server device for aggregation.

Figure 7:
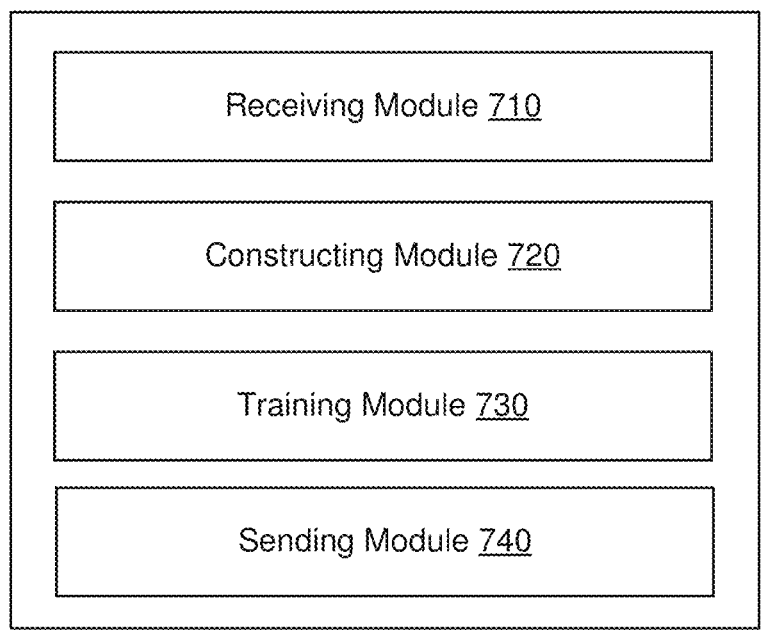
FIG. 7 illustrates a block diagram of a computer system for federated adversarial domain adaptation with saddle point optimization in accordance with some embodiments.

FIG. 7 illustrates a block diagram of a computer system for federated adversarial domain adaptation with saddle point optimization in accordance with some embodiments. The computer system 700 may be an example of an implementation of one or more modules in the computing system in FIGS. 1-5. The method 600 in FIG. 6 may be implemented by the computer system 700. The computer system 700 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 600. The computer system 700 may comprise various units/modules corresponding to the instructions (e.g., software instructions).

In some embodiments, the computer system 700 may be referred to as an apparatus for optimizing federated adversarial domain adaptation. The apparatus may comprise a receiving module 710 configured to receive, from a server device, model parameters of a global machine learning model being collaboratively trained by the client device and the server device; a constructing module 720 configured to construct a local machine learning model based on the model parameters of the global machine learning model, wherein the local machine learning model comprises two branches corresponding to two loss functions; a training module 730 configured to train the local machine learning model based on local training data, wherein the training comprises updating the model parameters to minimize a first of the two loss functions and maximize a second of the two loss functions; and a sending module 740 configured to send the updated model parameters back to the server device for further training (e.g., a global update)

Figure 8:
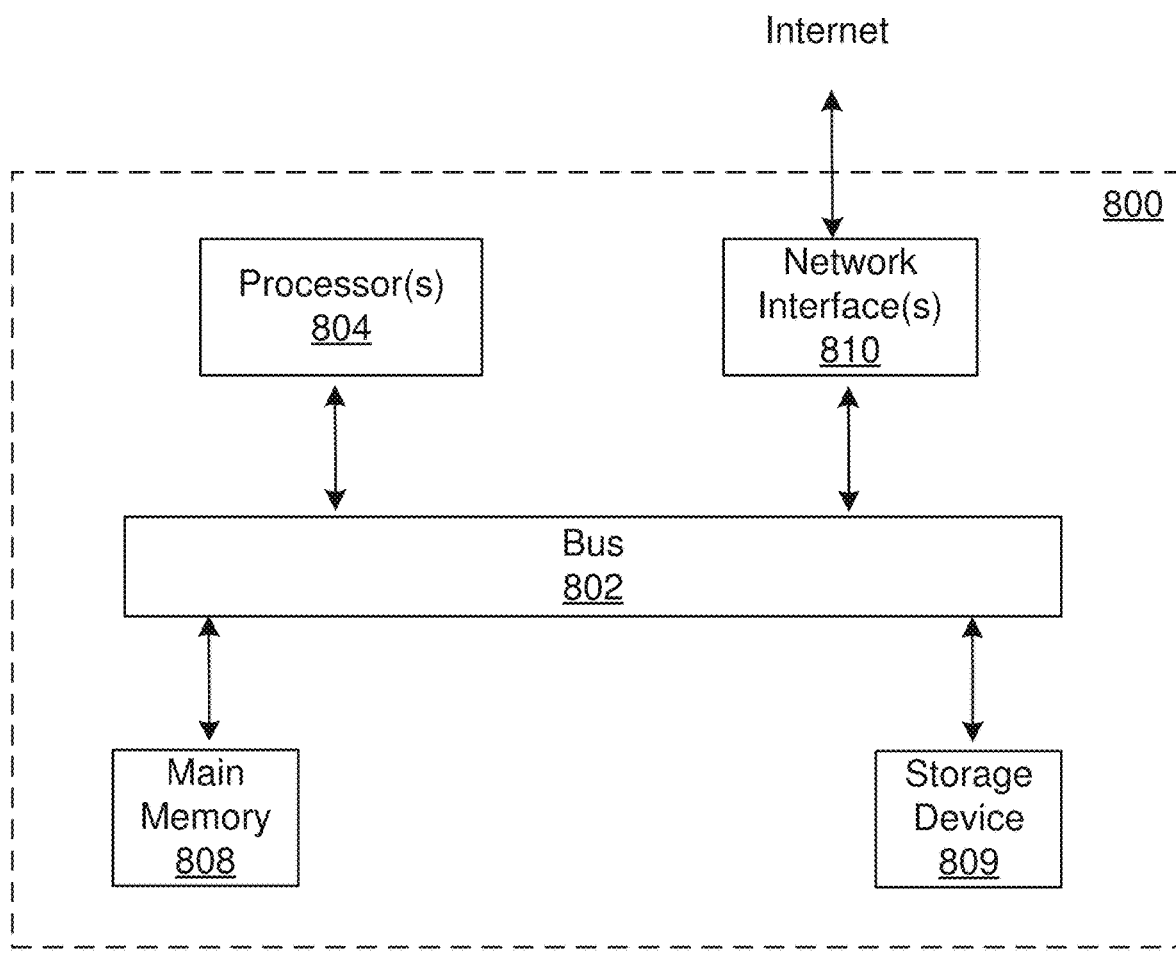
FIG. 8 illustrates an example computing device in which any of the embodiments described herein may be implemented.

FIG. 8 illustrates an example computing device in which any of the embodiments described herein may be implemented. The computing device may be used to implement one or more components of the systems and the methods shown in FIGS. 1-7 The computing device 800 may comprise a bus 802 or other communication mechanism for communicating information and one or more hardware processors 804 coupled with bus 802 for processing information. Hardware processor(s) 804 may be, for example, one or more general purpose microprocessors.

The computing device 800 may also include a main memory 808, such as a random-access memory (RAM), cache and/or other dynamic storage devices, coupled to bus 802 for storing information and instructions to be executed by processor(s) 804. Main memory 808 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 808 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 808. Such instructions may be read into main memory 808 from another storage medium, such as storage device 809. Execution of the sequences of instructions contained in main memory 808 may cause processor(s) 804 to perform the process steps described herein. For example, the processes/methods disclosed herein may be implemented by computer program instructions stored in main memory 808. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
    receiving, by a client device from a server device, model parameters of a global machine learning model, wherein the client device is one of a plurality client devices that receive the model parameters from the server device;
    constructing, by the client device, a local machine learning model based on the model parameters of the global machine learning model, wherein the local machine learning model comprises two branches corresponding to two loss functions;
    training, by the client device, the local machine learning model based on local training data, wherein the training comprises updating the model parameters to minimize a first loss function of the two loss functions and maximize a second loss function of the two loss functions at a same time; and
    sending, by the client device, the updated model parameters back to the server device to cause the server device to update parameters of the global machine learning model based on the updated model parameters from the client device and parameters received from other client devices of the plurality of client devices;
    receiving, by the client device from the server device, model parameters of an updated global machine learning model; and
    performing, by the client device, another round of local training based on the received model parameters of the updated global machine learning model.

2. The method of claim 1, wherein
    the local machine learning model comprises a feature extraction layer shared by a label prediction branch and a domain classification branch,
        the feature extraction layer extracting features from input training data,
        the label prediction branch predicting a label for the input training data based on the extracted features, and
        the domain classification branch predicting a domain from which the input training data is collected.

3. The method of claim 2, wherein the model parameters comprise a first set of parameters and a second set of parameters of the global machine learning model, and
    the constructing the local machine learning model comprises:
        constructing the feature extraction layer and the label prediction branch based on the first set of parameters; and
        constructing the domain classification branch based on the second set of parameters.

4. The method of claim 2, wherein the updating the model parameters to minimize the first loss function of the two loss functions and maximize the second loss function of the two loss functions comprises:
    adjusting the model parameters to minimize errors of the label prediction branch; and
    adjusting the model parameters to maximize errors of the domain classification branch.

5. The method of claim 1, wherein
    the local training data comprises labeled training data collected from one or more source domains and unlabeled training data from a target domain.

6. The method of claim 5, wherein the training the local machine learning model comprises:
    training a feature extraction layer and a label prediction branch based on the labeled training data; and
    training the feature extraction layer and a domain classification branch based on the labeled training data and the unlabeled training data.

7. The method of claim 1, wherein the model parameters from the server device comprise a first set of parameters and a second set of parameters of the global machine learning model, and the training the local machine learning model comprises:
　　obtaining predictions from the local machine learning model in response to input training data;
　　updating the first set of parameters using gradient descent based on the obtained predictions; and
　　updating the second set of parameters using gradient ascent based on the obtained predictions.

8. The method of claim 7, wherein the updating the first set of parameters using gradient descent comprises:
　　determining a new first set of parameters based on the first set of parameters and a first dual variable for restricting gradient divergence; and
　　wherein the updating the second set of parameters using gradient ascent comprises:
　　determining a new second set of parameters based on the second set of parameters and a second dual variable for restricting gradient divergence.

9. The method of claim 8, further comprising:
　　updating the first dual variable based on the new first set of parameters;
　　updating the second dual variable based on the new second set of parameters;
　　obtaining an updated first set of parameters based on the updated first dual variable and the new first set of parameters; and
　　obtaining an updated second set of parameters based on the updated second dual variable and the new second set of parameters.

10. The method of claim 9, wherein the sending the updated model parameters back to the server device for global update comprises:
　　sending the updated first set of parameters and the updated second set of parameters to the server device for aggregation.

11. A system of a client device comprising one or more processors and one or more non-transitory computer-readable memories coupled to the one or more processors and configured with instructions executable by the one or more processors to cause the system to perform operations comprising:
　　receiving, from a server device, model parameters of a global machine learning model, wherein the client device is one of a plurality client devices that receive the model parameters from the server device;
　　constructing a local machine learning model based on the model parameters of the global machine learning model, wherein the local machine learning model comprises two branches corresponding to two loss functions;
　　training the local machine learning model based on local training data, wherein the training comprises updating the model parameters to minimize a first loss function of the two loss functions and maximize a second loss function of the two loss functions at a same time;
　　sending the updated model parameters back to the server device to cause the server device to update parameters of the global machine learning model based on the updated model parameters from the client device and parameters received from other client devices of the plurality of client devices;
　　receiving, from the server device, model parameters of an updated global machine learning model; and
　　performing another round of local training based on the received model parameters of the updated global machine learning model.

12. The system of claim 11, wherein the local training data are collected from one or more domains, and
　　the local machine learning model comprises a feature extraction layer shared by a label prediction branch and a domain classification branch,
　　the feature extraction layer extracting features from input training data,
　　the label prediction branch predicting a label for the input training data based on the extracted features, and
　　the domain classification branch predicting a domain from which the input training data is collected.

13. The system of claim 12, wherein the updating the model parameters to minimize the first loss function of the two loss functions comprises:
　　adjusting the model parameters to minimize errors of the label prediction branch.

14. The system of claim 12, wherein the updating the model parameters to maximize the second loss function of the two loss functions comprises:
　　adjusting the model parameters to maximize errors of the domain classification branch.

15. The system of claim 11, wherein the model parameters from the server device comprise a first set of parameters and a second set of parameters of the global machine learning model, and the training of the local machine learning model comprises:
　　obtaining predictions from the local machine learning model in response to input training data;
　　updating the first set of parameters using gradient descent based on the obtained predictions; and
　　updating the second set of parameters using gradient ascent based on the obtained predictions.

16. A non-transitory computer-readable storage medium of a client device, configured with instructions executable by one or more processors to cause the one or more processors to perform operations comprising:
　　receiving, from a server device, model parameters of a global machine learning model, wherein the client device is one of a plurality client devices that receive the model parameters from the server device;
　　constructing a local machine learning model based on the model parameters of the global machine learning model, wherein the local machine learning model comprises two branches corresponding to two loss functions;
　　training the local machine learning model based on local training data, wherein the training comprises updating the model parameters to minimize a first loss function of the two loss functions and maximize a second loss function of the two loss functions at a same time;
　　sending the updated model parameters back to the server device to cause the server device to update parameters of the global machine learning model based on the updated model parameters from the client device and parameters received from other client devices of the plurality of client devices;
　　receiving, from the server device, model parameters of an updated global machine learning model; and
　　performing another round of local training based on the received model parameters of the updated global machine learning model.

17. The non-transitory computer-readable storage medium of claim 16, wherein the local training data are collected from one or more domains, and the local machine learning model comprises a feature extraction layer shared by a label prediction branch and a domain classification branch,
- the feature extraction layer extracting features from input training data,
- the label prediction branch predicting a label for the input training data based on the extracted features, and
- the domain classification branch predicting a domain from which the input training data is collected.

18. The non-transitory computer-readable storage medium of claim 16, wherein the model parameters from the server device comprise a first set of parameters and a second set of parameters of the global machine learning model, and the training of the local machine learning model comprises:
- obtaining predictions from the local machine learning model in response to input training data;
- updating the first set of parameters using gradient descent based on the obtained predictions, wherein the updating comprises determining a new first set of parameters based on the first set of parameters and a first dual variable for restricting gradient divergence; and
- updating the second set of parameters using gradient ascent based on the obtained predictions, wherein the updating comprises determining a new second set of parameters based on the second set of parameters and a second dual variable for restricting gradient divergence.

19. The method of claim 1, wherein the local training data comprises fMRI (Functional Magnetic Resonance Imaging) data collected by a medical scanner.

20. The method of claim 1, further comprising:
- quantizing, by the client device, the updated model parameters from continuous values to a smaller set of discrete finite values, and
- wherein the sending the updated model parameters to the server device comprises:
- sending the quantized model parameters to the server device.

* * * * *